May 31, 1966  A. H. TURNER ETAL  3,253,953
FUEL CELL FLOATING ELEMENTS
Filed Feb. 28, 1962
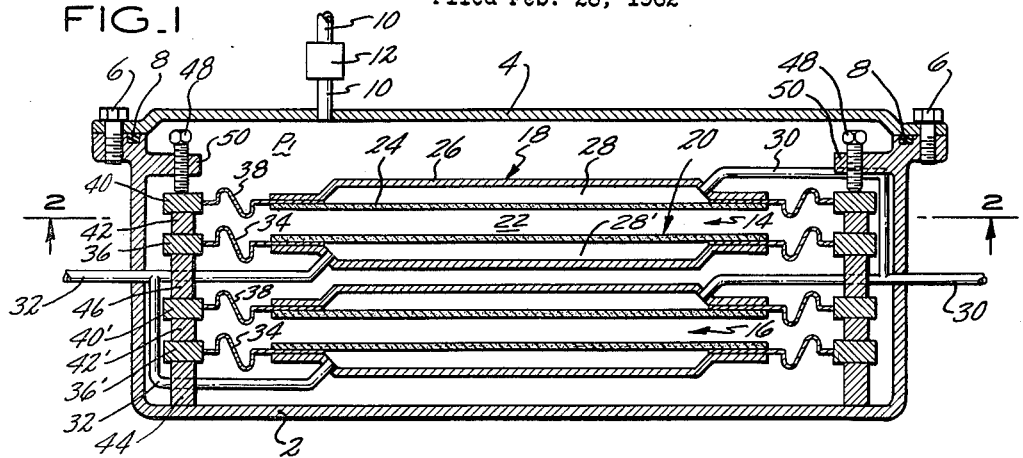
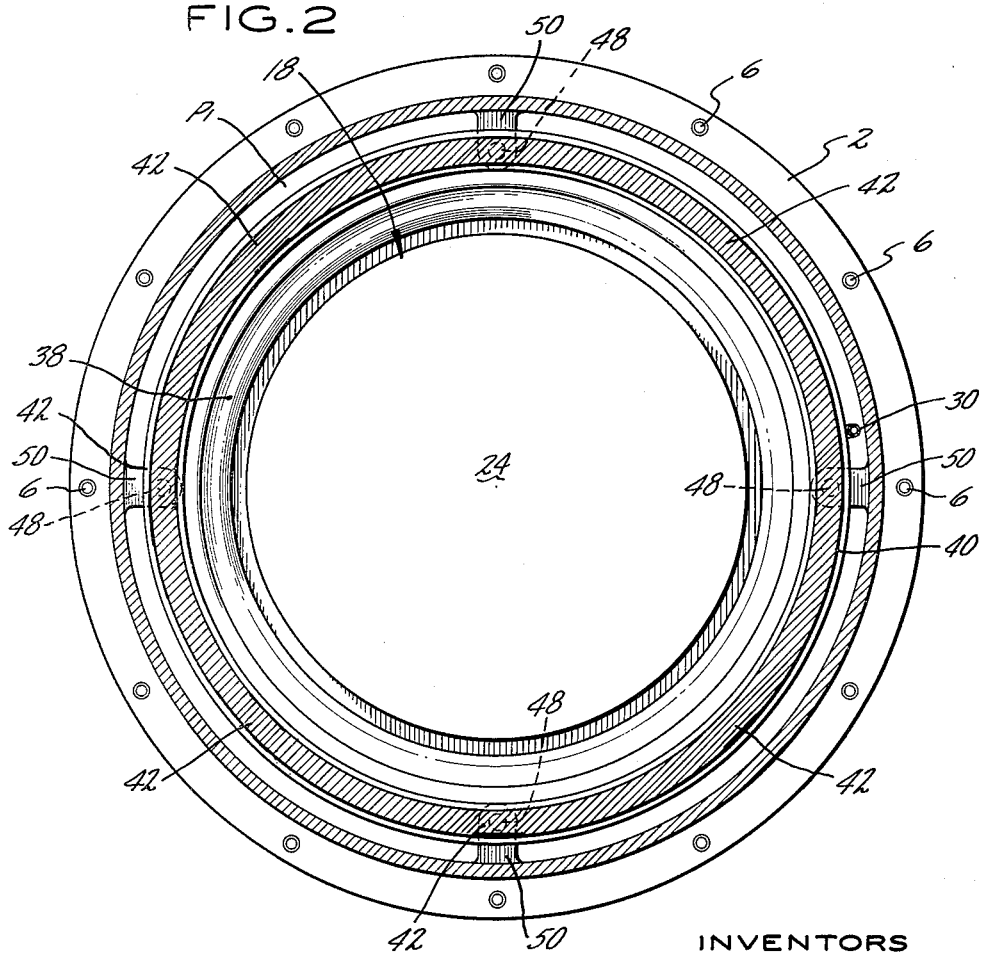
INVENTORS
ALBERT H. TURNER
MARIO J. DIOTALEVI
BY Charles A Warren
ATTORNEY United States Patent Office 3,253,953
Patented May 31, 1966

3,253,953
FUEL CELL FLOATING ELEMENTS
Albert H. Turner, East Hampton, and Mario J. Diotalevi, Somers, Conn., assignors to United Aircraft Corporation, East Hartford, Conn., a corporation of Delaware
Filed Feb. 28, 1962, Ser. No. 176,347
6 Claims. (Cl. 136—86)

This invention relates to a fuel cell system and particularly to an arrangement for mounting one or more fuel cells in a pressurized container. The invention described herein was made in the performance of work under a NASA contract and is subject to the provisions of the National Aeronautics and Space Act of 1958, Public Law 85–568 (72 Stat. 426; 42 U.S.C. 2451), as amended.

In assembling fuel cells for effective operation, a number of cells are preferably mounted together for the purpose of obtaining a usable power output. These cells must be supported in such a way and in spaced relation to one another so that a pressure may be applied to the outside wall surfaces of the electrodes thereby maintaining the necessary pressure on the electrolyte which fills the space between the electrodes. It will be understood that the electrolyte pressure must be very close to but slightly less than the pressure of gases within the electrodes in order to maintain effective operation of the individual cells.

Where the electrolyte is in a sealed chamber between the electrodes, the expansion of this electrolyte as the cell or cells heat up during operation must be compensated for without affecting the respective pressures of the electrolyte and fuel and oxidant gases. One feature of this invention is an arrangement to permit the necessary electrolyte expansion without affecting the established pressure on the electrolyte and without detrimentally affecting the relative positions of the opposed electrodes.

Another feature is a mounting arrangement for a fuel cell within a pressurized chamber such that the electrolyte may be sealed within the space provided, but may expand during cell operation with no substantial pressure change.

Other features and advantages will be apparent from the specification and claims and from the accompanying drawings which illustrate an embodiment of the invention.

FIG. 1 is a sectional view to a fuel cell system.
FIG. 2 is a sectional view substantially along the line 2—2 of FIG. 1.

Referring first to FIG. 1, the fuel cell system includes a container 2 having a cover 4 which is secured in such a way as to permit pressurizing of the container. For example, the cover may be held in position by bolts 6 and a suitable seal 8 between the cover and container will prevent leakage of the pressure fluid therein. A pressure tap 10 in the container cover permits maintenance of the pressure within the container at the selected level. If desired, a suitable pressure control 12 may be installed in the tap 10.

Within the container are positioned a plurality of fuel cells 14 and 16, each of which consists of opposed electrodes 18 and 20 which are spaced apart to define therebetween a space 22 in which the electrolyte for the cell is positioned. This electrolyte is under the pressure established within the container as will be apparent. Each electrode consists of a porous plate 24 in contact with the electrolyte and a non-porous plate 26 spaced from the porous plate except at the edges of the respective plates where they are brazed or otherwise securely attached together to define between the plates a chamber 28 to which either fuel or oxidant is supplied. In the arrangement shown, the container has a supply line 30 for fuel passing through the container and this line within the container leads to the upper electrode of the pair of electrodes for each of the individual fuel cells such that fuel under pressure is supplied to the chamber 28 of each of the upper electrodes.

The container also has an oxidant supply line 32 which internally of the container is connected to the oxidant space 28' in the lower electrode for each of the fuel cells.

Attached to the periphery of each of the lower electrodes (the oxidant electrode) of each fuel cell is a disc 34 forming an extension of the electrode and terminating in a ring 36 or frame element which is substantially thicker than the disc 34 and forms a relatively rigid supporting frame.

Attached to the periphery of each of the upper fuel electrodes of each cell is a diaphragm 38 which is flexible and which terminates in a supporting ring or frame element 40 having the same shape as the ring 36. Positioned between the rings 36 and 40 is a seal element 42 made of a material which will not be affected by the electrolyte and which provides a seal for the outer edge of the space between the ring 34 and the diaphragm 38. The electrolyte between the electrodes also fills the space between the disc 34 and diaphragm 38. It will be apparent that as the fuel cell reaches operating temperature, the increase in temperature results in a substantial increase in volume of the electrolyte. Since the diaphragm 38 is flexible, expansion of the electrolyte is permitted by the flexibility available in the diaphragm which permits the electrode 18 to move away from the electrode 20 thereby increasing the space occupied by the electrolyte. Since the pressures are the same on both sides of the electrode 18 this movement does not affect the pressures to any significant extent. This expansion occurs without any change in the cell pressure since this is maintained by the pressure within the surrounding container.

In assembling a plurality of cells within the container, the lower most fuel cell may be supported above the bottom wall of the container by spacer elements 44 engaging with the ring 36' for the lower most cell. Above the ring 36' is the seal 42' and above that the ring 40' for the lower most cell. The ring 36 of the cell next above is spaced from the ring 40' by spacer blocks 46. Pressure is applied to the uppermost ring 40 to maintain the necessary pressure on the seals 42 as by clamp bolts 48 positioned in brackets 50 on the inside of the container. In this way, any selected number of cells mounted within their supporting rings may be positioned within the container, the number of cells being limited only by the size of the container.

The construction of the diaphragm 38 permits a relative movement of the electrodes of any one cell away from each other during the expansion of the electrolyte as the cell goes into operation. In order that the cell may operate at best efficiency, the quantity of electrolyte is so selected that the electrodes will be more closely spaced than appropriate when the fuel cell is cold and not in operation, but as the electrolyte expands, the electrodes will be moved apart to the design spacing of the electrodes when the cell reaches operating temperature.

It is to be understood that the invention is not limited to the specific embodiment herein illustrated and described, but may be used in other ways without departing from its spirit as defined by the following claims.

We claim:
1. The combination with a fuel cell including spaced electrodes defining a space therebetween, an electrolyte filling said space and subject to expansion during fuel cell operation, a closed housing surrounding said cell and being pressurized to apply a selected pressure to the outer surfaces of the electrodes, a frame element surrounding each electrode in spaced relation thereto and substantially in the plane of the associated electrode, fluid tight closure means attached to and extending between the periphery of each electrode and the associated frame element, a fluid tight seal means between said frame elements to retain the fluid electrolyte within said space, at least one of said closure means being a flexible diaphragm to permit the associated electrode to move away from the other electrode for expansion of the electrolyte, and clamping means to hold said frame elements tightly against the seal means therebetween.

2. The combination as in claim 1 in which means are provided for holding said framing elements securely against the seal element therebetween.

3. The combination as in claim 1 in which a container encloses the electrodes and the frame elements and is pressurized to maintain a predetermined pressure on the outer surface of the electrodes.

4. The combination as in claim 1 in which a plurality of fuel cells are positioned within the closed housing in stacked relation with spacers between the frame elements of adjacent cells, and with the clamping means holding the frame elements and the seal means of the several cells as well as the spacers tightly clamped together.

5. The combination as in claim 1 in which the seal means also function to space the frame elements apart, and the pressure within the housing serving to hold the electrodes in contact with the electrolyte between said electrodes.

6. A fuel cell arrangement including a container having means for pressurizing the interior, at least one fuel cell within the container, said cell having spaced electrodes defining a space therebetween, an electrolyte in said space, a frame element surrounding each electrode in spaced relation thereto, a fluid tight closure means connected to and extending between the periphery of each electrode and the associated frame element, at least one of said closure means being flexible to permit movement of the electrodes relative to one another, a seal corresponding in shape to and positioned between the frame elements to contain the electrolyte within the space, and means within the container for clamping the frame elements against the seal.

References Cited by the Examiner

UNITED STATES PATENTS

| | | | |
|---|---|---|---|
| 2,638,920 | 5/1953 | Woodhull | 136—86 |
| 2,925,455 | 2/1960 | Eidensohn et al. | 136—86 |
| 2,969,315 | 1/1961 | Bacon | 136—86 |
| 3,012,086 | 12/1961 | Vahldieck | 136—86 |

FOREIGN PATENTS 396,221 6/1924 Germany.

WINSTON A. DOUGLAS, *Primary Examiner.*

JOHN R. SPECK, *Examiner.*

H. FEELEY, *Assistant Examiner.*